March 17, 1964
C. W. PRIBUS
3,125,012
APERTURE AND EXPOSURE CONTROL MECHANISM
FOR PHOTOGRAPHIC CAMERA
Filed June 27, 1962
2 Sheets-Sheet 1
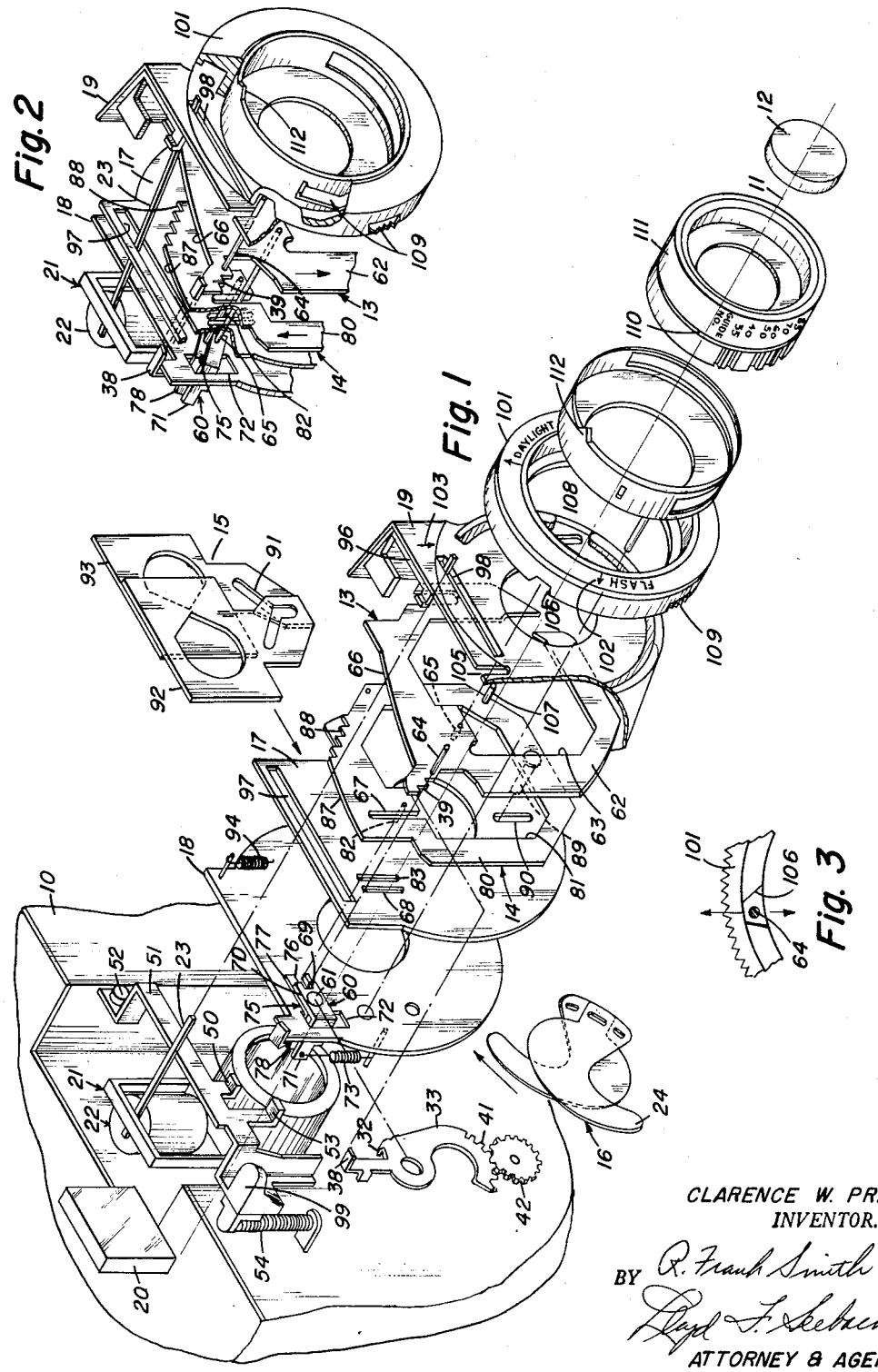
CLARENCE W. PRIBUS
INVENTOR.
BY R. Frank Smith
Lloyd F. Seebach
ATTORNEY & AGENT March 17, 1964  
C. W. PRIBUS  
APERTURE AND EXPOSURE CONTROL MECHANISM FOR PHOTOGRAPHIC CAMERA  
3,125,012

Filed June 27, 1962  
2 Sheets-Sheet 2

CLARENCE W. PRIBUS  
INVENTOR.

BY R. Frank Smith  
Lloyd F. Seebach  
ATTORNEY & AGENT 3,125,012
Patented Mar. 17, 1964

3,125,012
APERTURE AND EXPOSURE CONTROL MECHANISM FOR PHOTOGRAPHIC CAMERA
Clarence W. Pribus, Rochester, N.Y., assignor to Eastman Kodak Company, Rochester, N.Y., a corporation of New Jersey
Filed June 27, 1962, Ser. No. 205,588
10 Claims. (Cl. 95—10)

The present invention relates to photographic cameras and more particularly to automatic exposure control systems for such cameras.

The exposure control system of a camera can be operated automatically in response to variations in the brightness of the scene that is to be photographed by means for regulating the exposure aperture or the shutter speed or a combination thereof. It is known to utilize an exposure meter, which comprises a photoelectric cell coupled to a galvanometer-type electrical measuring instrument, for positioning a pointer or other output member as a function of the scene brightness. The position of the pointer can then be sensed by a member movable into engagement with the pointer; such member being coupled to the diaphragm to establish the exposure aperture, or to the shutter to set the shutter speed, or to both. In the present invention two pointer sensing members are used, one for establishing the exposure aperture and the other for setting the shutter speed. By this arrangement, a statistically predetermined optimum combination of exposure aperture and shutter speed can be obtained for any particular scene brightness.

When a camera having an automatic exposure control system is used for flash photography, it is the general practice to resort to manual setting of the exposure aperture and shutter speed. Under such manual operation, it frequently happens that the operator forgets to make the necessary manual setting. In the present invention, the use of two separate sensing members permits a connection to be made between the shutter speed sensing member and the selector ring, for automatically setting a predetermined shutter speed when the selector ring is moved to a position for flash operation. The exposure aperture can be established as a joint function of the adjustment of the focus ring and the selection of a flash guide number as disclosed in U.S. Patent 3,025,776.

It is a principal object of the invention to provide an improved exposure control system wherein two members, coupled to diaphragm and shutter speed setting members, respectively, are used to sense the position of an output member which is positioned as a function of the scene brightness, thereby to obtain an optimum combination of exposure aperture and shutter speed.

Another object of the invention is to provide an improved exposure control system wherein the shutter speed sensing member can be positioned relative to the shutter speed setting member to establish a predetermined shutter speed when the exposure control system is over-ridden for flash operation. Other objects of the invention will be apparent to those skilled in the art by the following description, reference being made to the accompanying drawings, wherein:

FIG. 1 is an exploded isometric view of the invention showing the exposure control mechanism adjusted for automatic (daylight) operation and with various parts set to one side for clarity;

FIG. 2 is a view similar to FIG. 1 showing the exposure control mechanism adjusted for flash operation;

FIG. 3 is a detail view showing the relation of the pin carried by the shutter speed sensing member to the cam slot in the selector ring;

Figure 4:
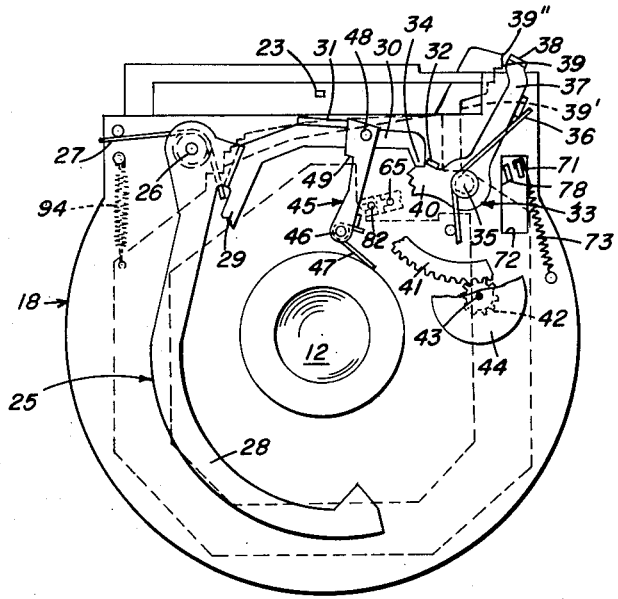
FIG. 4 is a rear elevation view of the plate on which the shutter mechanism is mounted and showing the shutter speed setting lever and its relation to the cam surface therefor on the shutter speed sensing member.

With reference particularly to FIG. 1 of the drawings, the camera casing 10 is provided with an optical axis 11 along which are disposed the lens system 12, the shutter speed sensing member 13, the diaphragm sensing member 14, the diaphragm 15, the shutter 16 and a photosensitive material (not shown), the diaphragm 15 being mounted on support plate 17 between said plate and the mounting plate 18 on which the shutter mechanism 16 is mounted. The parts described thus far are contained within housing 19 which is secured to the front face of casing 10 in a suitable manner.

A photocell 20 is mounted on the camera casing in such a way so to be illuminated by the viewed scene or object and is electrically connected to an electrical measuring instrument 21 comprising a movable coil 22 to which an output member or pointer 23 is connected for movement therewith. The output member 23 is moved angularly and its position is determined as a function of the light from the viewed scene which is incident on the cell 20. The cell 20 and instrument 21 are shown in diagrammatic form inasmuch as such a device is well known to those skilled in the art. Also, other light measuring devices, such as a solenoid or a hot-wire actuator can be used without departing from the invention described herein. The exposure control system described herein can be adjusted for changes in the film sensitivity (ASA No.) by varying the size of the photocell aperture as disclosed in U.S. Patent 3,016,811.

Figure 5:
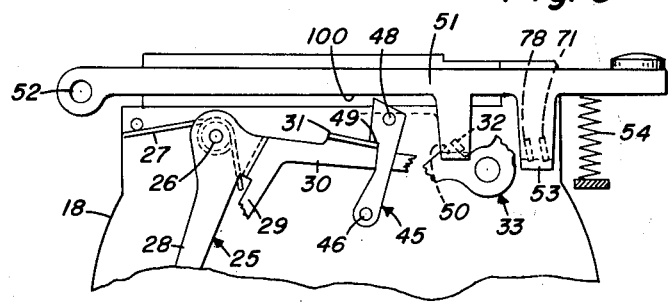
FIG. 5 is a detail elevation view similar to FIG. 4 showing the relation of the manually operable means for releasing the sensing members and the shutter speed setting member.
Figure 6:
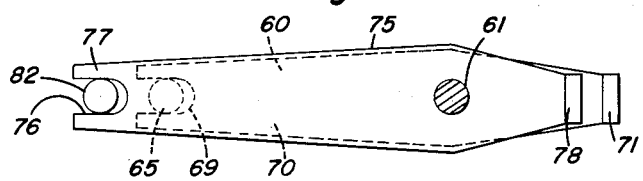
FIG. 6 is a detail elevation view of the members which yieldably drive the sensing members.

The rear face of plate 18, that is, the face toward housing 10, carries an exposure regulating device or shutter mechanism 16 which is of a well-known two blade impact type having several speeds; for example, $\frac{1}{40}$, $\frac{1}{80}$, $\frac{1}{125}$ and $\frac{1}{250}$ of a second. With reference to FIGS. 1, 4 and 5, the shutter actuating mechanism comprises a lever 25 which is pivotally mounted on plate 18 at 26 and is biased in a counterclockwise direction by spring 27. Lever 25 is formed with a setting arm 28, an actuating arm 29 which is connected to a member which actuates the blades 24, and a speed arm 30 which carries an upstanding lug 31, see FIGS. 4 and 5. The shutter speed is established by the position of lug 32 on shutter speed setting lever 33 relative to the nose 34 on speed arm 30. Setting lever 33 is pivotally mounted at 35 on plate 18 and is biased in a counterclockwise direction by spring 36. The arm 37 of lever 33 is formed with an extension 38 for engaging a stepped profile cam surface 39 on sensing member 13 in a manner to be described hereinafter. Arm 40 of lever 33 carries the lug 32 and is formed as a gear sector 41 which meshes with pinion 42, said pinion being freely rotatable on stud 43 and being secured to weight 44 which is rotatable therewith. A release level 45 is pivotally mounted on plate 18 and 46 and is biased in a counterclockwise direction by spring 47. The lever 45 carries a pin 48 and is provided with a shoulder 49 for engaging lug 31 when lever 25 is moved to a shutter setting position, as shown in FIG. 5.

While lever 25 can be manually actuated to a shutter setting position either after an exposure has been made or just before an exposure is to be made, it can also be coupled to a motor drive for advancing the photosensitive material or film. In this latter case, advancement of the film can take place immediately after an exposure has been made together with setting of the shutter. A member, not shown, and associated with such a motor drive, is arranged to engage the end of arm 28 and move lever 25 in a clockwise direction about its pivot at 26. With such movement, arm 30 and lug 31 are moved downward and lug 31 is engaged by shoulder 49, which then holds lever 25 in its set position. At the same time, nose 34 is removed from lug 32 to a position therebelow and spring 36 urges speed setting lever in a counterclockwise direction toward cam surface 39. Inasmuch as the shutter speed is to be established as a function of the light incident on the photocell 20, it is necessary to maintain the shutter speed setting lever 33 in the position shown in FIG. 4 until an exposure is to be made. This is accomplished by the lug 50 on the manually operable means 51 which is pivotally mounted on housing 10 at 52 and whose action is to be described hereinafter.

The yieldably movable control means for establishing the shutter speed as a function of the light incident on cell 20 comprises the sensing member 13 and a lever 60 pivotally mounted on stud 61 which is secured to plate 18. Sensing member 13 comprises a flat plate 62 having a configuration substantially as shown in FIG. 1. The central aperture 63 of plate 62 is of a size and shape to permit said plate to be moved relative to the axis 11 without interferring with the image being projected by lens system 12 onto the film. Plate 62 carries a pin 64 which extends toward casing 19 and also a pin 65 which extends toward plate 18. The function of pin 64 will be described hereinafter in connection with the "Flash" mode of operation. The top edge of plate 62 is provided with a cam surface 66 and at the upper left-hand edge, as viewed in FIG. 1, with a step profile or cam surface 39. Pin 65 extends through a slot 67 in sensing member 14, an aperture 68 in plate 17 and engages a slot 69 in the arm 70 of lever 60. Lever 60 also comprises an arm 71 which is formed at right angles to arm 70 and extends through an aperture 72 in plate 18. Spring 73 is secured to arm 70 and to plate 18 and exerts a force on lever 60 which tends to rotate it in a counterclockwise direction, whereby sensing member 13 is moved in a vertical direction so as to move cam surface 66 into engagement with output member 23. The amount of movement of sensing member 13 in a vertical direction will be dependent on the angular position of output member 23 relative to cam surface 66 which is shaped to provide the optimum shutter speed for any light condition. As a result, the cam surface 39 is also positioned relative to extension 38 so as to establish the movement of lever 33 which positions lug 32 relative to nose 34. This relationship determines the speed at which the shutter blades are opened and closed. In other words, when sensing member 13 is moved upward to a position in which step 39′ is opposite extension 38, see FIG. 4, the maximum movement of lever 33 takes place and the slowest shutter speed is attained, namely 1/40 second. When step 39″ is opposite extension 38, a minimum movement of lever 33 is permitted with the fastest shutter speed resulting therefrom; namely 1/250 second. Since lug 32 is positioned relative to nose 34 to establish the shutter speed, the initial speed due to spring 27 is reduced as soon as nose 34 picks up lever 33 and by means of sector 41 must then rotate pinion 42 and weight 44. At the slowest speed, lug 32 will be picked up almost immediately by nose 34 whereas at the fastest speed lug 32 will not be engaged until almost at the very end of the travel of nose 34 or will miss entirely.

In order to inhibit movement of sensing member 13 by spring 36 until an exposure is to be made, the manually operable means 51 is provided with a second lug 53 which engages the end of arm 71. The manually operable means or actuating member 51 is biased by spring 54 in a clockwise direction, as viewed in FIG. 1, and exerts a force sufficient to overcome that of spring 73. As a result, lug 53 maintains lever 60 and, hence, sensing member 13 in a position in which cam surface 66 is disengaged from output member 23 and cam surface 39 presents the fastest shutter speed step 39″ in the path of extension 38.

The yieldably movable control means for establishing the exposure aperture or the size of the opening in diaphragm 15 as a function of the light incident on cell 20 comprises the sensing member 14, the lever 75 and the diaphragm 15. Sensing member 14 comprises a flat plate 80 having a configuration as shown in FIG. 1. The central aperture 81 is of a size and shape to permit said plate to be moved relative to the axis 11 without interfering with the image being projected by lens system 12 onto the film. Plate 80 carries a pin 82 which extends through a slot 83 in plate 17 and engages the notch 76 in the arm 77 of lever 75 which is also pivotally mounted on stud 61 and beneath lever 60. The top edge of plate 80 is provided with a cam surface 87 which at the right-hand end thereof, as viewed in FIG. 1, terminates in a series of steps 88. These steps 88 are for the purpose of permitting sufficient movement of plate 80 relative to output member 23 to provide the larger openings in diaphragm 15. Plate 80 also carries a pin 89 which passes through the slot 90 in plate 17 and engages the cam slots 91 in the bottom of the diaphragm plates 92 and 93. A spring 94 has one end anchored to plate 18 and the other end connected to plate 80 so as to exert a force which tends to move plate 80 in a vertical direction so cam surfaces 87 or 88 engage that output member 23. Lever 75 is also provided with an end 78 which is formed over at right angles to arm 77 and which also extends through the aperture 72 in plate 18. This arm 77 is also engaged by the lug 53 on the actuating member 51, so as to hold plate 80 in a position in which the cam surfaces thereof are disengaged from the output member 23 until an exposure is to be made. The amount of movement of plate 80 will be dependent on the angular position of output member 23 relative to the cam surfaces 87 and 88. Also, the amount of vertical movement of plate 80 determines the relative positions of diaphragm plates 92 and 93 so as to form an exposure aperture as a function of the light incident on the photocell 20.

The plates 62 and 80 are maintained in relation to each other and for movement in a vertical direction by the spring 94 and 73 by the engagement of the pins 64, 65, and 82 as well as pin 89 with their respective slots in plate 17. Also, a vertical recess is provided on the inside surface 96 of casing 19 to guide movement of plate 63. As is evident from FIG. 2, the output member 23 overlies the plate 18, is movable through an aperture 97 in plate 17 and terminates in an aperture 98 in casing 19. In this way, the output member 23 overlies the cam surface 66 of sensing member 13 and the cam surfaces 87 and 88 of sensing member 14.

Assuming that the shutter 16 has been set as previously described, the camera is pointed toward the image or object to be photographed and the light incident on the photocell 20 causes the output member 23 to move in a clockwise direction as viewed in FIG. 1 as a function of the light intensity. The operator then depresses the finger piece 99 on the manually operable member 51 against the action of spring 54. As this occurs, the lugs 50 and 53 on the actuating member are moved downward and the springs 36, 73 and 94 start to move their respective members into an operative position. Arms 71 and 77 are fully released by lug 53 before lug 50 releases lug 32 on the shutter speed setting lever 33. As a result, the sensing members are moved vertically upward by means of springs 73 and 94 toward the output member 23. This movement of sensing members 13 and 14 is arrested when cam surfaces 66 and 87 or 88 engage output member 23 and places the cam surface 39 relative to the extension 38 on the shutter speed setting lever 33. During this movement, pin 89 engages the slots 91 of plates 92 and 93 and moves said plates toward each other to provide an exposure aperture. In this way both the shutter speed and the exposure aperture are established as a function of the light intensity incident on photocell 20.

As the manually operable member is continued in its downward movement, the underside edge 100 thereof abuts the pin 48 on release member 45 causing it to move in a clockwise direction, thereby releasing the lug 31 from the shoulder 49. When this occurs, the spring 27 drives the lever 25 in a counterclockwise direction to actuate the shutter by means of arm 29, the speed being determined by the relation of lug 32 with respect to nose 34 as established by the position of cam 39 relative to extension 38. It can be readily appreciated that inasmuch as sensing members 13 and 14 are independently driven by their respective springs 73 and 94, the movement of these sensing members will not necessarily be exactly the same, due to the shape of cam surfaces 66, 87 and 88. When the movement of the two sensing members are considered together, an optimum shutter speed and exposure aperture combination is obtained as a function of the light intensity on the photocell 20.

When the manually actuated member 51 is released after having actuated the shutter 16, spring 54 returns this member to its normal position. When this occurs, the lugs 50 and 53 pick up the lug 32 and the arms 71 and 77, respectively, thereby moving the sensing members 13 and 14 in a vertically downward direction and moving the cam surfaces thereof out of engagement with the output member 23. This movement is accomplished by means of the pivotal action of the levers 60 and 86 which are connected to the sensing members by the respective pins 65 and 82. As pointed out above, if an automatic film advance is incorporated in the camera, then the movement of the sensing members 13 and 14 occur as just described and the shutter 16 will also be set for the next exposure.

In making an exposure wherein a flash lamp is used, it is usually necessary to manually set the shutter speed at a predetermined speed and manually adjust the exposure aperture in accordance with the film guide number and the subject to camera distance. In U.S. Patent 3,025,776, an aperture control mechanism for automatically changing the exposure aperture in accordance with the film guide number is disclosed. The structure disclosed in this patent is partially shown in FIG. 1, the selector ring being designated by the numeral 101. In order to make a flash exposure, the selector ring 101 is rotated in a clockwise direction to position the "Flash" indicator mark 102 opposite the index 103 on the casing 19. Normally, in the course of making photographs by daylight, the pin 64 on plate 62 extends through a slot 105 in the front wall of casing 19 and lies within a slot 106 in the selector ring 101, the slot 106 having a shape such that the plate 62 and pin 64 can be moved vertically without any interference. However, when the selector ring 101 is rotated to the "Flash" position, the slot 106 cams the pin 64 downwardly and under the flange of the ring so as to position the uppermost portion of cam surface 39 under the extension 38, the direction of rotation of lever 60 being clockwise so as to remove arm 71 from lug 53. In this position of cam surface 39, the movement of the shutter speed setting lever 33 in a counterclockwise direction by means of spring 36 is unobstructed and the predetermined shutter speed for a flash exposure is thus obtained. As described in the above-mentioned patent, the diaphragm aperture is also established by means of the pin 107 on sensing member 14 which extends through a slot 108 in casing 19 and into a position relative to a cam (not shown) which is described in detail in U.S. Patent 3,025,776 for adjusting the opening in diaphragm 15. As described in this patent, a latching means 109 is provided which permits the flash guide numbers 110 on the focus ring 111 to be set relative to the index 112 and in accordance with such setting and movement of ring 111 for focusing the exposure aperture is established upon depression of finger piece 99.

As finger piece 99 is depressed, lever 33 is free to rotate in a counterclockwise direction, as viewed in FIG. 4, until the end of the sector 41 prevents further movement. At this point, extension 38 will be in a position equivalent to that as if it had been stopped by step 39′. The sensing member 14 moves upwardly, as described above, and by means of pin 89 actuates the diaphragm blades 92 and 93. However, in this case for a flash exposure, the movement of the sensing member 14 is arrested when pin 107 engages the cam (not shown) associated with selector ring 101 as described in U.S. Patent 3,025,776. The shutter 16 is actuated by member 51 when finger piece 99 is fully depressed and the various parts are then returned to their normal positions as described above.

From the foregoing description it can be readily appreciated that the invention disclosed and described herein provides a "programmed" exposure arrangement wherein an optimum condition of shutter speed and exposure aperture is always obtained without any necessity for the operator to match pointers or to set in any calculated values. Also, the provision for a predetermined shutter speed and an exposure aperture established by the film guide number and subject to camera distance eliminates any possibility of the operator forgetting to set one of these values into the camera before making a flash exposure.

The invention has therefore been described in detail with particular reference to a preferred embodiment of the invention but it is to be understood that various modifications and changes therein can be incorporated by those skilled in the art and still be within the invention as defined by the appended claims.

Having now particularly described my invention, what I desire to secure by Letters Patent of the United States and what I claim is:

1. In a camera having an exposure meter disposed for energization by scene light and having an output member constituting a part of said meter and positioned as a function of the intensity of said light, the combination comprising:

an exposure regulating device comprising a shutter having a speed setting member movable to any one of a plurality of positions for daylight operation and to a predetermined position for flash operation;

a yieldably movable control means including a member adapted to be moved in one direction for daylight operation to engage said output member for sensing the position thereof and cooperating with said setting member to control movement of the latter to one of said plurality of positions corresponding to the position of said output member, and adapted to be moved in another direction for flash operation for cooperating with said setting member to control movement of the latter to said predetermined position;

a first manually operable means controlling said sensing means and movable between a daylight position in which said sensing member is free to move into and out of engagement with said output member and a flash position in which said sensing member is moved thereby in said other direction and inhibited from movement in said one direction; and a second manually operable means normally holding said setting member in a position disengaged from said control means and movable through a first distance for releasing said setting member for movement into engagement with said control means to etsablish said shutter speed and beyond said first distance for actuating said shutter.

2. A camera in accordance with claim 1 wherein said first manually operable means comprises a selector ring concentric with said lens axis and provided with a slot for receiving a pin carried by said sensing member, said pin being free to move in said slot when said ring is in said daylight position and said slot moving said pin in said opposite direction when said ring is moved to said flash position.

3. In a camera having a lens system disposed along a lens axis for focusing an image of a viewed scene onto a photo-sensitive surface, and an exposure meter disposed for energization by light from said scene and having an output member constituting a part of said meter and positioned as a function of the intensity of said light, the combination comprising:

a first exposure regulating device comprising a shutter having a shutter speed setting member movable to a speed setting position;

a first yieldably movable control means including a member adapted to engage said output member for sensing the position thereof and for cooperating with said setting member to establish said speed setting position;

a second exposure regulating device comprising an adjustable diaphragm;

a second yieldably movable control means coupled to said diaphragm and including a member adapted to engage said output member for sensing the position thereof to establish the size of the exposure aperture; and manually operable means normally holding said first control means, said second control means and said setting member in positions in which said sensing members are disengaged from said output member and said setting member is disengaged from said first control means, said operable means being movable through a first distance for releasing said first and second control means for movement of said sensing members into engagement with said output member and said setting member for movement into engagement with said first control means to adjust at least one of said regulating devices as a function of the intensity of said light and beyond said first distance for actuating said shutter.

4. A camera in accordance with claim 3 wherein said shutter sensing member comprises a plate having a first cam surface and a second cam surface, said plate being biased for movement in a direction normal to said lens axis to move said first cam surface into engagement with said output member whereby said second cam surface is positioned with respect to said shutter speed setting member to establish the shutter speed.

5. A camera in accordance with claim 3 including a first resilient member connected to said diaphragm sensing member and a second resilient member connected to said shutter speed sensing member for moving said sensing members linearly and independently of each other into engagement with said output member upon release by said manually operable means.

6. A camera in accordance with claim 3 including a focus adjusting ring concentric with said lens axis, a manually operable selector ring concentric with said lens axis and coupled to said focus ring, said selector ring being rotatable from a daylight position to a flash position for establishing said exposure aperture independently of said output member as a joint function of the adjustment of said focus ring and the selected flash guide member, and means connecting said selector ring to said shutter speed sensing member for moving said sensing member to a position relative to said shutter speed setting member to establish a predetermined shutter speed for flash operation.

7. A camera in accordance with claim 6 wherein said connecting means comprises a pin carried by said shutter speed sensing member which engages a cam slot in said selector ring, said pin being freely movable into and out of said cam slot with movement of said shutter speed sensing member when said selector ring is in said daylight position and being moved into engagement with said selector ring by said cam slot to inhibit movement of said shutter speed sensing member when said selector ring is moved into said flash position.

8. In a camera having a lens system disposed along a lens axis for focusing an image of a viewed scene onto a photosensitive surface and a focus adjusting means, the combination comprising:

a first exposure regulating device comprising a shutter having a shutter speed setting member movable to a predetermined speed setting position;

a first control means including a member adapted to be moved to a position for cooperating with said speed setting member to establish said predetermined speed setting position;

a second exposure regulating device comprising an adjustable diaphragm;

a yieldably movable control means coupled to said diaphragm and including a sensing member adapted to move in a predetermined path;

a manually movable cam adapted to cooperate with said sensing member;

selector means coupled to said cam and having an initial position for maintaining said cam out of the path of said sensing member, said selector means being movable from said initial position to any one of a plurality of positions for moving said first control means into said cooperating position and for coupling said cam to said focus adjusting means in any of a plurality of positional relationships representing selectable flash guide numbers for movement with said focus adjusting means to adjust said cam to a position for intercepting said sensing member to set said diaphragm opening as a function of the focus adjustment and the selected flash guide number; and a manually operable means normally holding said yieldably movable control means and said speed setting member in inoperative positions, said operable means being movable through a first distance for releasing said yieldably movable control means and said speed setting member for movement into engagement with said cam and said first control means to establish the diaphragm opening and the shutter speed and beyond said first distance for actuating said shutter.

9. In a camera having a focus adjusting means and an exposure meter disposed for energization by scene light and having an output member constituting a part of said meter and positioned as a function of the intensity of said light, the combination comprising:

a first exposure regulating device comprising an adjustable shutter having a range of exposure times;

a first means for sensing the position of said output member to adjust said shutter to an exposure time corresponding to the position of said output member and for adjusting said shutter to a predetermined exposure time;

a second exposure regulating device comprising an adjustable diaphragm having a range of exposure apertures;

a second means coupled to said diaphragm for selectively sensing the position of said output member and said focus adjusting means to adjust said diaphragm to an exposure aperture corresponding to the position of said output member and said focus adjusting means; and manually operable control means movable between a daylight position in which said first and second sensing means are enabled to adjust said shutter and said diaphragm as related functions of scene brightness and a flash position in which said first sensing means adjusts said shutter to said predetermined exposure time and said second sensing means is enabled to adjust said diaphragm as a function of focus adjustment.

10. In a camera having a focus adjusting means including a diaphragm control member, and an exposure meter disposed for energization by scene light and having an output member constituting a part of said meter and positioned as a function of the intensity of said light, the combination comprising:
- a first exposure regulating device comprising a shutter having a shutter speed setting member movable to any one of a plurality of speed setting positions and to a predetermined speed setting position;
- a first control means including a shutter control member movable in one direction to engage said output member for sensing the position thereof and cooperating with said setting member to control movement of the latter to one of said plurality of speed setting positions corresponding to the position of said output member and in another direction for cooperating with said setting member to control movement of the latter to said predetermined speed setting position;
- a second exposure regulating device comprising an adjustable diaphragm;
- a second control means coupled to said diaphragm and including a diaphragm actuating member movable to any one of a plurality of positions to selectively engage said output member and said diaphragm control member for sensing the position thereof for establishing the size of the exposure aperture; and
- manually operable means movable between a daylight position in which said shutter control member and said diaphragm actuating member are enabled for sensing the position of said output member to establish one of said shutter speed setting positions and the size of the exposure aperture as a function of the light intensity and a flash position in which said shutter control member is moved in said other direction to establish said predetermined speed setting position and said diaphragm control member is enabled for engagement by said diaphragm actuating member to establish the size of the exposure aperture as a function of focus adjustment.

References Cited in the file of this patent

UNITED STATES PATENTS

| | | |
|---|---|---|
| 2,993,422 | Rentschler | July 25, 1961 |
| 3,016,811 | Bundschuh | Jan. 16, 1962 |
| 3,025,776 | Bundschuh | Mar. 20, 1962 |